E. SCHMITT.
VEHICLE WHEEL TIRE.
APPLICATION FILED MAY 5, 1916.
1,203,915.
Patented Nov. 7, 1916.
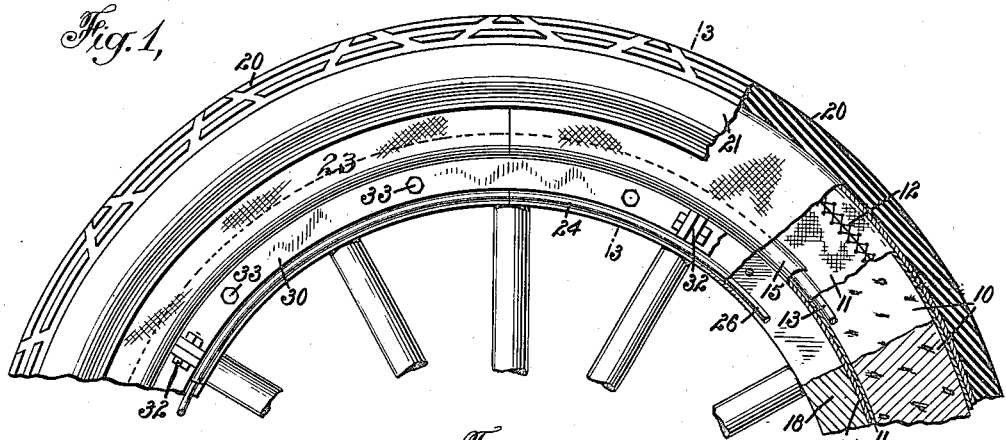
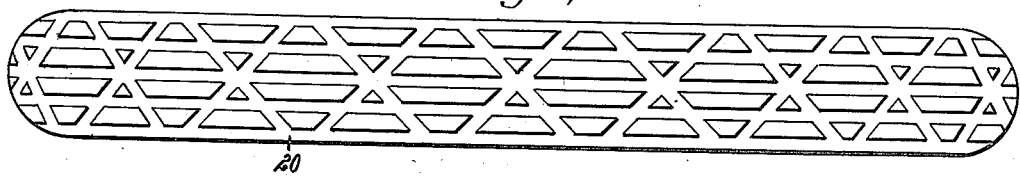
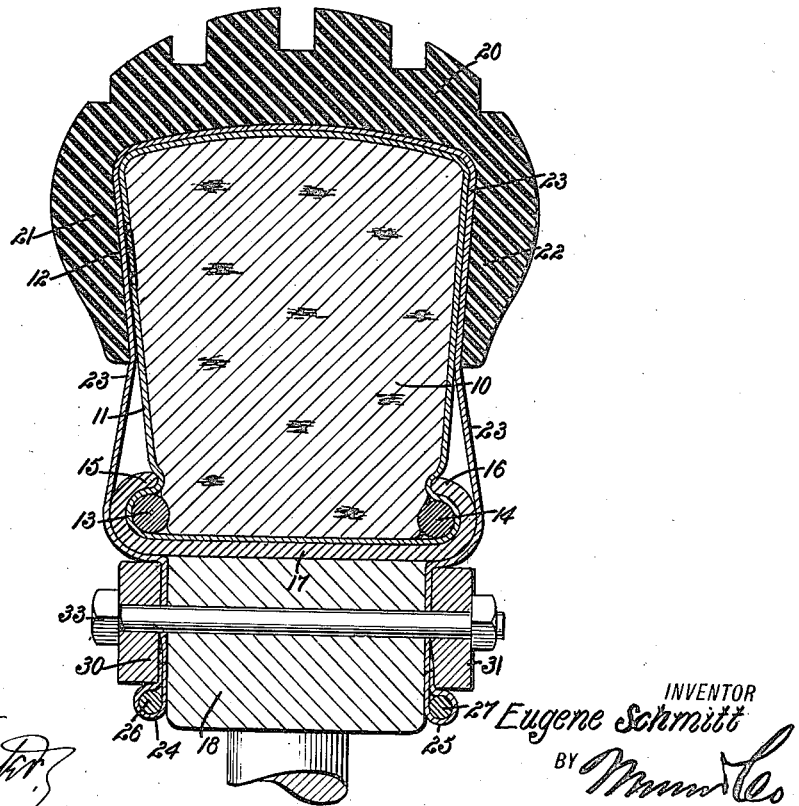
WITNESSES
INVENTOR
Eugene Schmitt
BY
ATTORNEYS

UNITED STATES PATENT OFFICE.

EUGENE SCHMITT, OF NEW YORK, N. Y.

VEHICLE-WHEEL TIRE.

1,203,915.  Specification of Letters Patent.  Patented Nov. 7, 1916.

Application filed May 5, 1916. Serial No. 95,572.

*To all whom it may concern:*

Be it known that I, EUGENE SCHMITT, a citizen of the United States, and a resident of the city of New York, Astoria, borough of Queens, in the county of Queens and State of New York, have invented a new and Improved Vehicle-Wheel Tire, of which the following is a full, clear, and exact description.

The object of the invention is to provide a new and improved vehicle wheel tire, arranged to provide the desired cushioning effect without the use of pneumatic means, to permit of conveniently attaching the tire to the felly of the wheel and to allow replacing of a worn out tread by a new one whenever necessary.

In order to accomplish the desired result use is made of a tire body made of a resilient material such as cork, a covering inclosing the said tire body, retaining rings within the said covering and at the inner corners of the said body, and a rim provided with retaining flanges into which fit the said retaining rings and the portions of the covering overlying the rings. Use is also made of a tread of rubber having inwardly extending flanges and fitting onto the tire body, an attaching member of a flexible material secured to the inner face of the tread and its flanges, the sides of the attaching member extending inward over the rim flanges and onto the sides of the wheel felly, abutting rings attached to the terminals of the sides of the attaching member, ring-shaped plates overlying the sides of the attaching member at the sides of the felly, and bolts extending through the felly, the said sides of the attaching member and the said plates to fasten the parts in place on the felly, the said abutting rings of the attaching member abutting against the inner edges of the said plates.

A practical embodiment of the invention is represented in the accompanying drawings forming a part of this specification in which similar characters of reference indicate corresponding parts in all the views.

Figure 1 is a side elevation of a portion of a vehicle wheel provided with the improved tire, parts being shown in section; Fig. 2 is a plan view of the same; and Fig. 3 is an enlarged cross section of the same on the line 3—3 of Fig. 1.

The body 10 of the tire is made of a cushioning material such as cork, and the body 10 is approximately rectangular in cross section and is inclosed in a covering 11 of canvas, leather or a like flexible material, one side of the covering being provided with a lacing 12 for tightly closing the covering around the body 10. Within the covering 11 at the inner corners of the body 10 are arranged rings 13 and 14 fitting with the corresponding covering portions into clencher flanges 15 and 16 integral on the sides of a rim 17 engaging the peripheral face of the usual felly 18 of the vehicle wheel. Thus by the arrangement described the tire body 10 is securely fastened in position on the rim 17, it being understood that in placing the body 10 in position on the rim 17 the rings 13 and 14 are pressed toward each other to readily pass into the flanges 15 and 16, the resiliency of the body material permitting such movement of the rings 13 and 14.

The tread 20 of the tire is preferably of rubber and is provided with inwardly extending flanges 21 and 22 and to the inner face of this tread 20 and its flanges 21 and 22 is secured a flexible attaching member 23 of leather, canvas or similar material. The attaching member has its sides extending inwardly and passing over the flanges 15 and 16 and onto the sides of the felly 18. The terminals of the sides of the attaching member 23 are provided with hems 24, 25 in which are held abutting rings 26, 27. The portions of the sides of the attaching member 23 overlying the sides of the felly 18 are engaged by ring-shaped plates 30 and 31, preferably made in sections fastened together by bolts 32, as plainly indicated in Fig. 1. The bolts 33 extend transversely through the felly 18, the sides of the attaching member 23 and the plates 30 and 31 to securely fasten the parts to the felly, and the abutting rings 26, 27 extend along the inner edges of the plates 30 and 31 so as to securely hold the attaching member 23 in position.

By making the tire body 10 of cork or similar resilient material a desired cushioning effect is obtained, and by constructing the body 10 in the manner described it can be readily fastened in place on the rim 17. The tread 20 is securely fastened in position on the body 10 by the means described, but in case the tread becomes worn out it can be readily removed by removing the bolts 33 and the plates 30 and 31 to allow of lifting the tread 20 off the tire body 10. For this purpose the attaching member 23 and the rings 26 and 27 are split or made in sections. A new tread constructed in the manner described can then be placed in position on the tire body and fastened in place by the plates 30 and 31 and the bolts 33, as above described. By providing the tread 20 with the flanges 21 and 22 it is evident that the outer portion of the tire body 10 is completely protected against injury and hence such tire body lasts a long time.

The cork used for the body 10 may be piece cork or granulated cork bound together by a suitable binding material so as to retain the rectangular or keystone shape shown in Fig. 3.

Having thus described my invention, I claim as new and desire to secure by Letters Patent:—

1. A vehicle wheel having a felly and a rim, and a tire comprising a tire body made of a resilient material such as cork, a covering inclosing the said body, retaining rings within the said covering, the said body having inner corners at which the said rings are arranged, the said rim being provided with curved retaining flanges extending inward at their edges and into which fit the said retaining rings and the portions of the covering overlying the rings.

2. A vehicle wheel having a felly, a rim on said felly, and a tire comprising a tire body of cork and approximately rectangular in cross section, the tire body having inner corners, a covering of a flexible material inclosing the said tire body and laced at one side, retaining rings within the said covering at the inner corners of the said tire body, the said rim being provided with curved flanges extending inwardly over the said rings and engaging the said rings and the portions of the covering overlying the rings.

3. A vehicle wheel having a felly, a rim on said felly, and a tire comprising a tire body made of a resilient material such as cork, a covering inclosing the said body, retaining rings within the said covering, the said body having inner corners at which the said rings are arranged, the said rim being provided with fastening flanges into which fit the said retaining rings and the portions of the covering overlying the rings, a tread of rubber having inwardly extending flanges, and an attaching member of a flexible material secured to the inner face of the tread and its flanges and secured to the said felly.

4. A vehicle wheel, comprising a rim having retaining flanges, a tire body engaging the said rim, rings engaging the tire body, the retaining flanges of the rim extending over the said rings, a tread of rubber having inwardly extending flanges and fitting onto the outer face and sides of said tire body, and means for removably securing the tread in position.

5. A vehicle wheel having a felly, a rim on said felly, and a tire, comprising a tire body, a covering of flexible material inclosing the said tire body, retaining rings within the covering and engaging the tire body, the said rim being provided with fastening flanges into which fit the said retaining rings and the portions of the covering overlying the rings, a tread, fitting onto the covering of the tire body, and means for securing the tread in position.

6. A vehicle wheel tire, comprising a tire body made of resilient material, a covering inclosing the said tire body, retaining rings within the said covering at opposite sides of the tire body and engaging the said tire body, a tread having inwardly extending flanges and fitting on the outer face and sides of the said tire body, and attaching means connected with the said tread.

EUGENE SCHMITT.